(12) United States Patent
Ponziani

(10) Patent No.: US 7,056,085 B2
(45) Date of Patent: Jun. 6, 2006

(54) METHODS AND APPARATUS FOR SENSING PARAMETERS OF AIR FLOWS

(75) Inventor: Robert Louis Ponziani, West Chester, OH (US)

(73) Assignee: General Electric Company, Schenectady, NY (US)

(*) Notice: Subject to any disclaimer, the term of this patent is extended or adjusted under 35 U.S.C. 154(b) by 147 days.

(21) Appl. No.: 10/888,249

(22) Filed: Jul. 9, 2004

(65) Prior Publication Data

US 2006/0008345 A1    Jan. 12, 2006

(51) Int. Cl.
*G01F 1/46* (2006.01)
*F01D 21/12* (2006.01)

(52) U.S. Cl. .................. 415/118; 415/191; 73/861.65
(58) Field of Classification Search ............. 415/118, 415/191; 416/61; 73/861.65
See application file for complete search history.

(56) References Cited

U.S. PATENT DOCUMENTS

| 2,946,221 | A | * | 7/1960 | Douglas et al. .......... 73/861.65 |
| 3,581,569 | A | | 6/1971 | Black |
| 4,244,222 | A | * | 1/1981 | Hoyer et al. ............. 415/118 |
| 4,420,738 | A | | 12/1983 | Rehmann et al. |
| 4,595,298 | A | | 6/1986 | Frederick |
| 4,733,975 | A | | 3/1988 | Komanetsky et al. |
| 4,791,818 | A | | 12/1988 | Wilde |
| 4,976,844 | A | | 12/1990 | Selin et al. |
| 5,731,507 | A | | 3/1998 | Hagen et al. |
| 6,001,228 | A | | 12/1999 | Huber et al. |
| 6,622,564 | B1 | | 9/2003 | Imai |
| 6,657,217 | B1 | | 12/2003 | Adams et al. |
| 6,678,164 | B1 | | 1/2004 | Chikuan et al. |
| 6,742,395 | B1 | | 6/2004 | Borgers et al. |
| 6,755,084 | B1 | | 6/2004 | Tsukada et al. |
| 2002/0178730 | A1 | | 12/2002 | Ganz et al. |

* cited by examiner

*Primary Examiner*—Edward K. Look
*Assistant Examiner*—Richard A. Edgar
(74) *Attorney, Agent, or Firm*—William Scott Andes; Armstrong Teasdale LLP

(57) ABSTRACT

A vane assembly includes a vane having a main axis, a first passageway within the vane substantially parallel to the main axis, and a second passageway aligned with the first passageway. The vane has a window portion between the first passageway and the second passageway. The vane assembly also includes a sensor inserted in the first passageway and having a portion held in place in the second passageway, wherein a portion of the sensor is exposed in the window portion of the vane.

20 Claims, 3 Drawing Sheets

METHODS AND APPARATUS FOR SENSING PARAMETERS OF AIR FLOWS

STATEMENT REGARDING FEDERALLY SPONSORED RESEARCH & DEVELOPMENT

The U.S. Government has certain rights in this invention as provided for by the terms of Contract No. N00019-96-C-0176 awarded by the Department of the Navy.

BACKGROUND OF THE INVENTION

This invention relates generally to sensors and airfoils useful for various types of engines and other apparatus, and more particularly to sensors integrated into vanes.

Sensors typically include two basic structures. One of these structures is an element that measures a physical attribute of interest, such as temperature or pressure, and that also provides a useful signal in either an electrical or other physical form. The other structure is an external body that simultaneously mounts, supports, and protects the sensing element. This two-part configuration allows the entire sensor to be removed and replaced independently of other local hardware in, for example, an aircraft.

Some sensors are immersed in an environment of flowing fluids that have highly dynamic secondary properties (such as one or more of pressure, temperature, turbulence, conductivity, directional vector, etc.). The design of the external supporting structure of such sensors relative to the sensing element can significantly affect the accuracy and the time constant of measurements made by that element.

Typically, a supporting body of a sensor is not intended to perform vane-vectoring effects on a flow stream. Instead, sensors are designed to induce as little and as neutral an effect as possible on a flow stream. The depth of immersion of a sensor and the width and shape of its body should be designed to minimize induced effects on the flow stream. Also, the sensor should be made only large enough for durability and to reach the particular zone of interest having the physical property to be measured. A potentially steep tradeoff exists between measuring attributes of a flowstream, interfering with the flowstream itself, and sensor strength and reliability. Thus, mounting a separate sensor in a flowstream can have a significant negative effect on the flowstream itself. For example, at least one known prior art assembly includes a sensor mounted at a separate, cantilevered body near the top of a vane. Such standalone-type sensors add their own turbulence and blocking to an air stream, requiring an increase in air flow speed to make up for the reduction in flow area.

A sensor element that is integrated into an airfoil or other fluid flow vane is typically mounted and configured in one of the following three ways:

(1) The sensor is enclosed inside the flow vane body, with or without aspiration holes in the walls of the flow vane. Holes allow a portion of the flow stream to enter inside the flow vane cavity to reduce the signal response time constant or increase accuracy of the sensor measurement. Enclosing a sensor in the body of a flow vane always results in the sensor signal having a longer time constant than that of an unenclosed sensor. This longer time constant can be shortened only by modifications in the flow vane that sacrifice flow vane strength and integrity, such as aspiration holes or thinning a wall dimension to reduce the bulk mass of the flow vane. The radiant temperature of the flow vane body surrounding the sensor affects the sensor element time constant, or in case of pressure, the size of the aspiration holes will affect the pressure rate of change. This configuration may not be effective in an application with highly dynamic secondary properties as described above.

(2) The sensor protrudes from walls of a body element of the flow vane. In this configuration, the sensor element protrudes into the flow stream from the normal flow vane element, which is defined here as a projection of a cross section of the flow vane along an axial length with very low or no profile discontinuity features. This cantilevered sensor configuration allows a quarter wave primary vibration response. It is difficult or impossible to remove or install the sensor intact in this configuration without making the sensor flexible. However, it may not be desirable for a sensor to be flexible in a very hot and/or fast flow stream environment, as durability of the exposed portion of the sensor may be reduced. Axial removal of the flow vane is also complicated by protrusion of the sensor element, which is typically mounted substantially orthogonal to a wall surface of the flow vane.

(3) The sensor is applied directly to the skin of the flow vane body walls. In this case, an already planned and optimized flow vane design may not require extensive modification. However, the exposed sensor body can disrupt airflow over the entire length of the sensor lead element. A strong tradeoff exists between reliability and the magnitude of the disruption of the primary flow because more reliable sensors are larger in size and more likely to disrupt the primary flow. Usually, this configuration is used in development studies due to low sensor reliability. In addition, vane removal may be difficult due to the external modification.

Although each of these sensor configurations provides adequate sensor information, it is clear that the tradeoffs involved for each may not be desirable for particular sensor/vane flow measurement applications. For example, these configurations may not minimize airflow disruption while simultaneously maintaining or improving reliability and time constant of either the sensor element or of the flow vane.

BRIEF DESCRIPTION OF THE INVENTION

Some aspects of the present invention therefore provide a vane assembly that includes a vane having a main axis, a first passageway within the vane substantially parallel to the main axis, and a second passageway aligned with the first passageway. The vane has a window portion between the first passageway and the second passageway. The vane assembly also includes a sensor inserted in the first passageway and having a portion held in place in the second passageway, wherein a portion of the sensor is exposed in the window portion of the vane.

In other aspects, the present invention provides a vane assembly that includes a vane having a main axis, a first passageway within the vane substantially parallel to the main axis, and a second passageway aligned with the first passageway. The vane has a window portion between the first passageway and the second passageway. The vane assembly also includes a sensor inserted in the first passageway and having a portion held in place in the second passageway, wherein a portion of the sensor is exposed in the window portion of the vane in a central portion of the vane.

In yet other aspects, the present invention provides a method for servicing a failed sensor inserted in a first passageway of a vane, held in place in a second passageway of the vane aligned with the first passageway, and having a portion exposed in a window portion of the vane. The method includes pulling the failed sensor out of the vane and pushing a replacement sensor into the vane, wherein the pushing and the pulling are performed without removing the vane from an assembly in which it is secured.

In yet another aspect, the present invention provides a method for measuring a physical property of an air flow. The method includes supporting a sensor in passageways on opposite sides of a window of a vane, wherein the sensor is exposed in the window between the passageways. The method further includes passing air across the vane.

It will be appreciated that some configurations of the present invention provide an economical sensor and vane configuration that reduces weight and flow obstruction relative to configurations having a separate sensor body that supports only the sensor element. In addition, some configurations of the present invention provide increased sensor reliability compared to some other externally exposed design alternatives and have a smaller flow vane disruption zone over some other externally exposed design alternative. Other advantages of various configurations of the present invention will be appreciated from the detailed description below.

DETAILED DESCRIPTION OF THE INVENTION

As used herein, the term "vane" should be read as encompassing vanes, wings, and airfoils unless otherwise explicitly limited.

Figure 1:
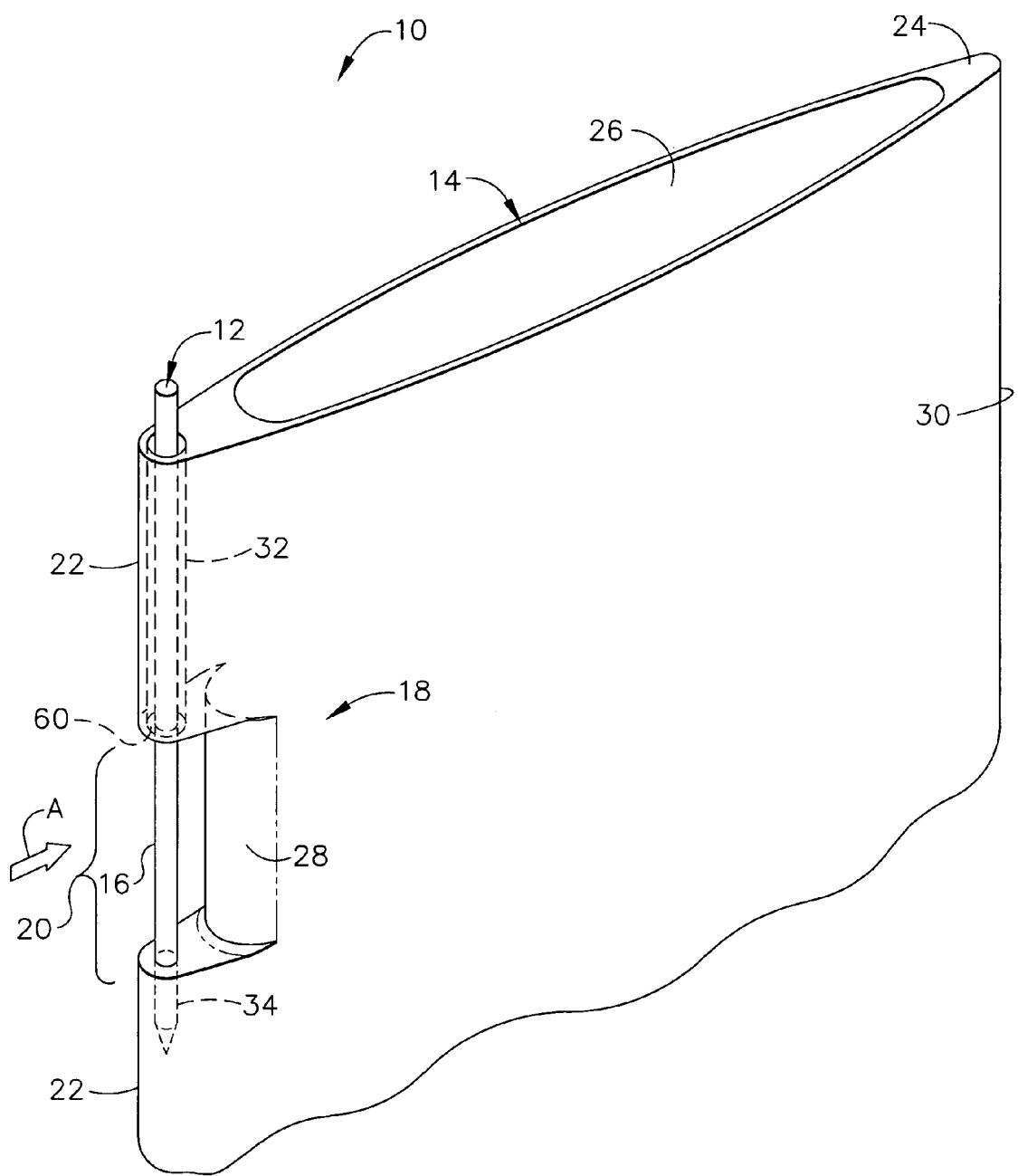
FIG. 1 is a perspective view representative of some configurations of a vane assembly of the present invention in which a sensor is near a leading or a trailing edge of a vane.

In some configurations of the present invention and referring to vane and sensor assembly 10 shown in FIG. 1, a sensor element 12 is mounted substantially parallel to a main axis of a flow vane 14, and only a portion 16 of sensor element 12 is exposed directly to free flow stream A. Sensor 12 is inserted into a first passageway 32 having a wider diameter than sensor 12 and is pushed through until a bottom portion of sensor 12 passes through a second passageway 34 on the other side of window 20, which comprises cut-away portion 18 of vane 14. First passageway 32 and second passageway 34 are substantially parallel to the main axis of flow vane 14. In some configurations, sensor 12 is held in place by first passageway 32 and second passageway 34 and at least partly by a relatively tight fit within second passageway 34. Additionally, teeth 60 are provided at a window end of first passageway 32 in some configurations to tightly but removably hold sensor 12 in place in a manner described below. The sensor is restrained at second passageway 34 to advantageously achieve a half-wave frequency response. If the sensor were cantilevered, it would achieve a quarter wave frequency response, which requires greater physical strength for the sensor to withstand in some applications.

Configurations such as assembly 10 integrate exposed portion 16 of sensor 12 into a window 20 of vane or airfoil 14. In many of these configurations, one or more of the following advantages are achieved: fast sensor response, excellent vibration resistance (in configurations in which both ends of the sensor are secured), and only localized flow disruption that is mitigated by a trailing flow vane portion. Some configurations also avoid introducing protrusions from the axially projected profile of airfoil 14 and/or aspiration holes in airfoil 14. In addition, in some configurations, sensor element 12 can be replaced without removing airfoil or flow vane 14 from an assembly in which it is secured, such as a jet engine. Many configurations also provide more economical sensor 12 replacement than discrete sensors.

Referring to FIG. 1, a working sensor element or elements (not shown) of sensor 12 are in a portion 16 of sensor 12 in airflow stream A. The remaining portions of sensor 12 include lead wire (not shown in FIG. 1), or for a pressure sensor, a pressure lead (also not shown in FIG. 1). The working element (for example and without limitation, a thermocouple) is within a "window" 20 that comprises an open part of modified section 18 of vane 14. As shown in FIG. 1, airflow stream A is directed to a leading edge 22 of vane 14, and window 20 is an opening in leading edge 22. Although not shown in FIG. 1, in some configurations, top portion 24 of vane 14 has a flange installed on its surface, and/or sensor 12 has a separate flange that sits on top of the flange on vane 14. Neither flange is required in all configurations of the present invention, and some configurations include only one of these flanges. Sensor 12 extends out of top surface 24 of vane 14 to facilitate removal, retrieval, and/or replacement of sensor 12 by simply pulling it out of vane 14. Vane 14 is unlikely to fail as often as sensor 12 in most applications. Thus, the ability to retrieve a failed sensor by pulling it out and replacing it by pushing in a replacement sensor without having to remove vane 14 from a larger assembly in which it is installed is an advantage offered by many configurations of the present invention.

Assembly 10 can be used in applications such as, for example and without limitation, jet engines or other types of engines. In some configurations, a tubular opening 26 is therefore provided at top portion 24 of vane 14 to allow air flow between parts of the engine. Transport of other fluids can also be accommodated (for example, oil can be passed through tubes inside opening 26, or air can be passed with or without tubes). Such fluids are used in some configurations to cool vane 14 and/or to allow air flow from a hot section to a cooler section. Sensor 12 is not located in cavity 26 in the assembly 10 configuration shown in FIG. 10, and so there is advantageously no transfer of fluids between any cavities holding sensor 12 and cavity 26 in vane 14.

More generally, vane 14 is an external element that mounts and supports sensor 12, including portion 16 containing the sensor element or elements. In some configurations, vane 14 can rotate about the sensor, but it is not required to do so by the invention, nor is sensor 12 intended as a hinge, even though it is not necessarily excluded from acting as one in all configurations of the present invention.

Cut-away portion 18 is configured to provide a window 20 at which sensor portion 16 containing an active sensor is exposed to air stream A for measurement of the physical properties of the air stream. In some configurations, a reduction in turbulence in air stream A relative to other sensor configurations is desirable, so the shape of recessed surface 28 is configured to reduce or minimize turbulence.

Vane 14 in FIG. 1 is a fixed vane, although in other configurations, vane 14 can be a wing or airfoil. In some configurations, vane 14 is used in a jet engine. In most jet engine applications, sensors such as sensor 12 do not last very long because they are exposed to an extreme environment. Although the reliability of sensors used in jet engines has improved, sensors still need occasional replacement. In at least one known prior art jet engine configuration, it is necessary to replace an entire assembly housing a sensor when it becomes necessary to replace the sensor in the assembly. However, various configurations of the present invention advantageously allow sensor 12 to be removed and replaced separately from vane 14. The ability to replace sensor 12 rather than an entire assembly 10 results in a significant cost saving and a simplified servicing procedure.

In FIG. 1, air flow A flows roughly from left to right, and sensor A is located near leading edge 22 of vane 14. In some cases, it is advantageous to locate sensor 12 and cut-away 18 at a trailing edge 30 of vane 14 instead of a leading edge, depending upon the aerodynamic quantity of interest to be measured. Because of the symmetry of vane 14 in the example assembly 10 of FIG. 1, a similar result would be obtained if air flow A were directed in the opposite direction to that shown. Such configurations are useful when a laminar flow over the vane is required, and accurate pressure measurements can be obtained in such configurations. However, an air flow A as shown in FIG. 1 may provide more accurate temperature measurements in at least some cases. If one's interest is in making the flow laminar over the vane, sensor 12 and cut-away portion 18 can be located near a trailing rather than a leading edge of a vane.

The bottom of vane 14 is not shown in FIG. 1, as its full extent may vary depending upon the application and otherwise is not material to the practice of the present invention. Top portion 24 of vane 14 shown in FIG. 1 could be extended as well, or top portion 24 can be a finished part of vane 14. In some of the latter configurations, a flange (not shown) is mounted on top portion 24, or top portion 24 is attached to a case (also not shown) that covers a plurality of vanes in a desired arrangement. Sensor 12 can be pulled out of top portion 24.

Figure 2:
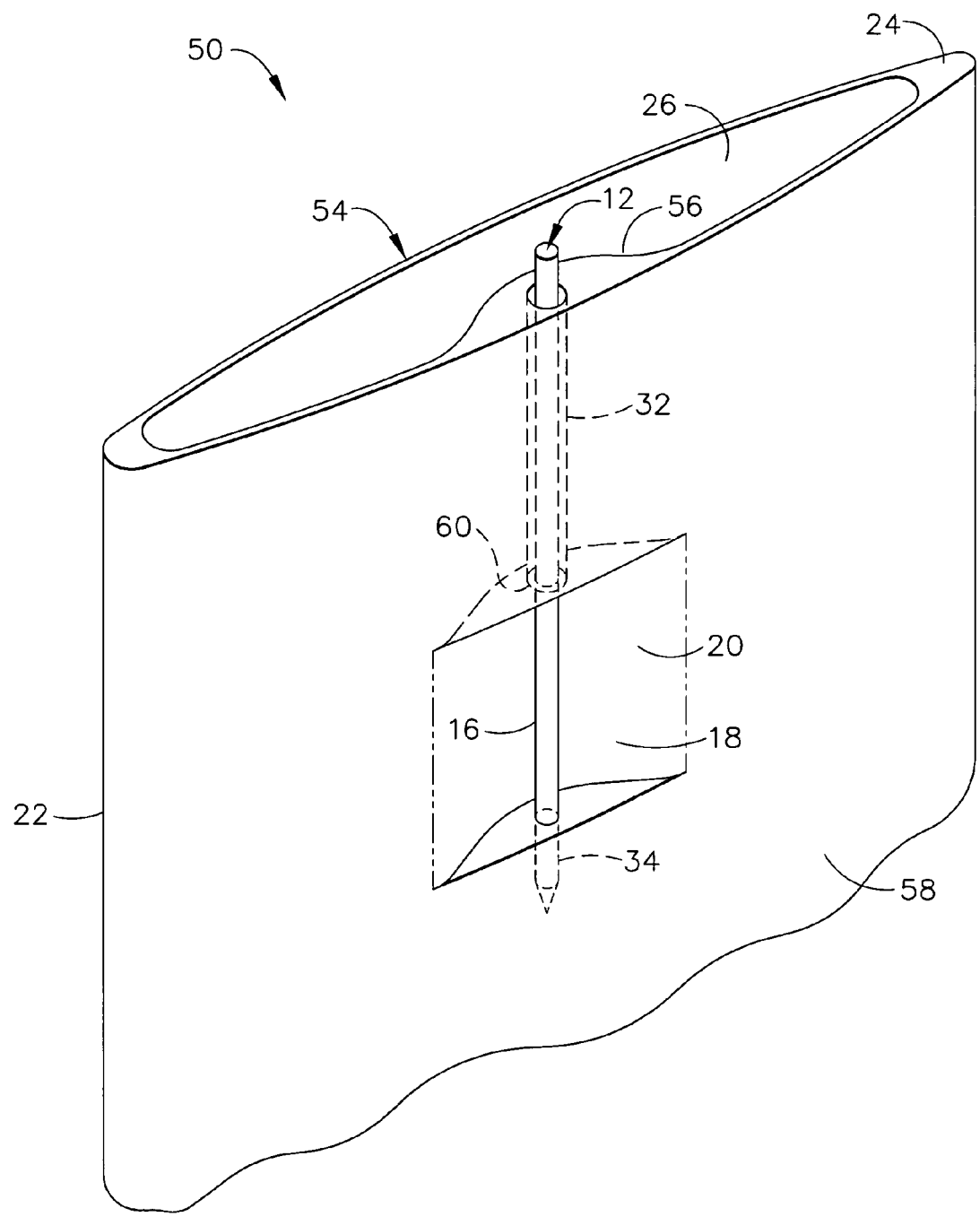
FIG. 2 is a perspective view-representative of some other configurations of a vane assembly of the present invention in which a sensor is near a central portion of a vane.

In some configurations of the present invention and referring to FIG. 2, an assembly 50 is provided having a sensor 12 a central portion of a vane 54. Sensor 12 is inserted into a first passageway 32 in an internal bulge 56 of a wall 58 of vane 54 and is also held in place by second passageway 34, similarly to the manner in which it is held in place in the configuration illustrated in FIG. 1. A window 20 formed by a recess (i.e., cut-away portion) 18 in an outer surface of wall 58 exposes an active portion 16 of sensor 12. This configuration allows vane 54 to be cast as a unitary object, as is advantageous in some applications. Teeth 60, if present, may be added by machining in some configurations.

In the example configuration of FIG. 2, vane 54 is a neutral vane. For a turning vane having a camber (rather than a neutral vane acting as a support to minimize the disruption the air flow), it may be desirable to have air flow go over sensor 12 on the pressure side if pressure is a physical property to be measured. Advantageously, configurations of the present invention having a sensor 12 in a central portion of a vane 54 avoid disruptions of air flow on a leading edge 22. Also, at the pressure side of a turning vane a large disruption of air flow that extend all the way across to the suction side would be avoided.

Assembly 50 show in FIG. 2 provides a tradeoff that still reduces a disruption of air flow compared to conventional sensor configurations, but sensor 12 in assembly 50 is provided at location where an overall disruption is minimized or reduced, and/or the disruption that does occur is in a more tolerable location for some applications.

Figure 3:
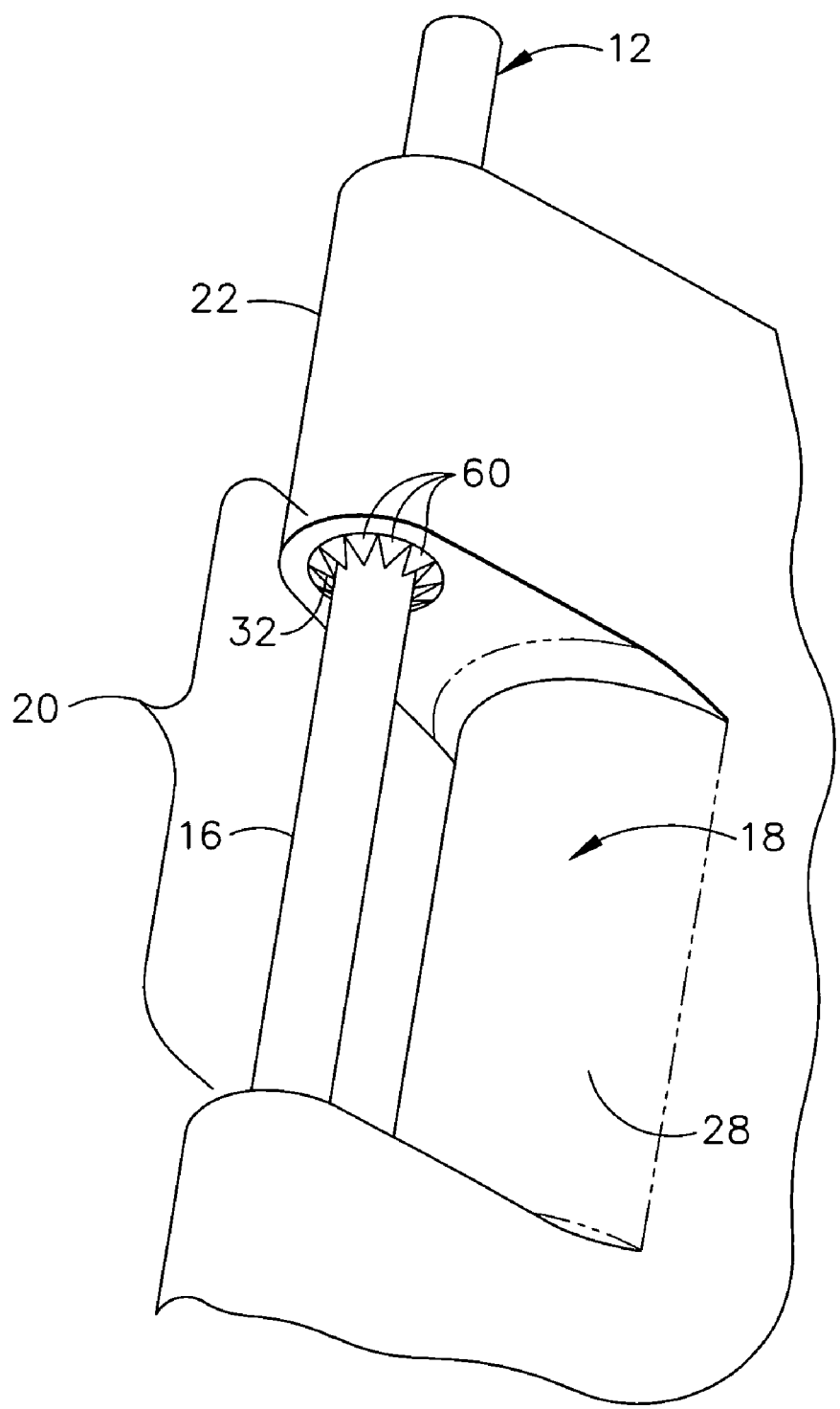
FIG. 3 is a perspective view showing a dirt removal feature of some configurations of the present invention.

In some configurations and referring to FIG. 3, tooth-like structures 60 extending outward into window 20 are provided at an opening of a first passageway 32 into which sensor 12 is inserted. Teeth 60 protrude into window 20 somewhat and act as a breaker. Aside from firmly holding sensor 12 in place, teeth 60 also serve to shear off carbon, soot, and other debris (i.e., "dirt") that may accumulate on the outside of sensor 12, as it typically does in some applications. To break this dirt, sensor 12 is turned. The dirt is stripped off when sensor 12 is withdrawn. Thus, in addition to firmly holding sensor 12 in place, teeth 60 also facilitate withdrawal of sensor 12 by preventing debris from inhibiting its removal.

Although cut-away portion 18 and window 20 in FIGS. 1, 2, and 3 are shown as being quite large in comparison to sensor 12, cut-away portion 18 and window 20 in other configurations can be very closely coupled to sensor 12 itself and still allow accurate sensor readings. Moreover, in some configurations, recessed surface 28 in has a concave or a flat shape rather than the convex shape shown in FIGS. 1 and 3. The shape of recessed surface 28 can be selected in accordance with the sensor measurement desired, and one of ordinary skill in the art can select a shape to achieve a desired aerodynamic vs. accuracy tradeoff upon gaining an understanding of the present invention.

It will thus be observed that some configurations of the present invention allow concurrent use of the flow vane to both direct airflow and to provide support for a sensor element. The result is an economical sensor configuration that reduces weight and flow obstruction relative to configurations having a separate sensor body that supports only the sensor element. In addition, configurations of the present invention increase sensor reliability compared to some other externally exposed design alternatives and have a smaller flow vane disruption zone over some other externally exposed design alternative. Some configurations of the present invention free stream sensor exposure to increase accuracy and reduce or minimize the sensor time constant and maintain a stronger vane structure than some alternative designs that use thinned flow vane walls or aspirating holes to reduce the sensor time constant. In addition, some configurations of the present invention provide relative protection of the sensor within an axially projected envelope of a flow vane. For an RTD device sensor configuration, the entire element portion of some configurations is positioned orthogonal to the free flow stream in an optimized orientation. Alternate positions that are axial to the flow stream are also possible in a configuration that reduces the disrupted flow stream along the length of the flow vane.

While the invention has been described in terms of various specific embodiments, those skilled in the art will recognize that the invention can be practiced with modification within the spirit and scope of the claims.

What is claimed is:

1. A vane assembly comprising:
   a vane having a main axis, a first passageway within the vane substantially parallel to the main axis, a second passageway aligned with the first passageway, and a window portion between the first passageway and the second passageway; and
   a sensor inserted in the first passageway and having a portion held in place in the second passageway, wherein a portion of the sensor is exposed in the window portion of the vane.

2. An assembly in accordance with claim 1 wherein the first passageway has a wider diameter than the second passageway.

3. An assembly in accordance with claim 1 further comprising teeth at an opening of the first passageway that are configured to hold said sensor removably in place.

4. An assembly in accordance with claim 3 wherein said teeth protrude into the window portion between the first passageway and the second passageway.

5. An assembly in accordance with claim 1 wherein said sensor is proximate a leading edge of said vane.

6. An assembly in accordance with claim 1 wherein said sensor is proximate a trailing edge of said vane.

7. An assembly in accordance with claim 1 wherein said sensor extends outside a top surface of said vane.

8. An assembly in accordance with claim 1 wherein said vane further includes a tubular opening separate from the first passageway and the second passageway configured to allow air flow between parts of an engine.

9. An assembly in accordance with claim 1 wherein said vane is a cast, unitary vane.

10. An assembly in accordance with claim 1 wherein said sensor is a pressure sensor.

11. An assembly in accordance with claim 1 wherein said sensor is a temperature sensor.

12. A vane assembly comprising:
- a vane having a main axis, a first passageway within the vane substantially parallel to the main axis, a second passageway aligned with the first passageway, and a window portion between the first passageway and the second passageway; and
- a sensor inserted in the first passageway and having a portion held in place in the second passageway, wherein a portion of the sensor is exposed in the window portion of the vane in a central portion of said vane.

13. An assembly in accordance with claim 12 wherein said first passageway and said second passageway are in an internal bulge of a wall of said vane.

14. An assembly in accordance with claim 12 wherein said vane is a neutral vane.

15. An assembly in accordance with claim 12 wherein said vane is a turning vane.

16. A method for servicing a failed sensor inserted in a first passageway of a vane, held in place in a second passageway of the vane aligned with the first passageway, and having a portion exposed in a window portion of the vane, said method comprising:
- pulling the failed sensor out of the vane; and
- pushing a replacement sensor into the vane,
- wherein said pushing and said pulling are performed without removing said vane from an assembly in which it is secured.

17. A method in accordance with claim 16 wherein said vane and sensor are in a jet engine.

18. A method in accordance with claim 16 further comprising using teeth on the first passageway to strip dirt off the sensor when pulling the failed sensor out of the vane.

19. A method in accordance with claim 18 further comprising turning the sensor to break the dirt.

20. A method for measuring a physical property of an air flow, said method comprising:
- supporting a sensor in passageways on opposite sides of a window of a vane, wherein said sensor is exposed in the window between the passageways; and
- passing air across the vane.

* * * * *